(12) United States Patent
De Vries et al.

(10) Patent No.: US 11,871,869 B2
(45) Date of Patent: Jan. 16, 2024

(54) COFFEE MACHINE WITH INTEGRATED STEAM AND HOT WATER GENERATION

(71) Applicant: KONINKLIJKE PHILIPS N.V., Eindhoven (NL)

(72) Inventors: Johannes Hotze Bernhard De Vries, Eindhoven (NL); Rodin Enne Bruinsma, Eindhoven (NL)

(73) Assignee: VERSUNI HOLDING B.V., Eindhoven (NL)

( * ) Notice: Subject to any disclaimer, the term of this patent is extended or adjusted under 35 U.S.C. 154(b) by 518 days.

(21) Appl. No.: 16/956,396

(22) PCT Filed: Dec. 13, 2018

(86) PCT No.: PCT/EP2018/084651
§ 371 (c)(1),
(2) Date: Jun. 19, 2020

(87) PCT Pub. No.: WO2019/121270
PCT Pub. Date: Jun. 27, 2019

(65) Prior Publication Data
US 2020/0352389 A1 Nov. 12, 2020

(30) Foreign Application Priority Data

Dec. 21, 2017 (EP) .................................... 17209242

(51) Int. Cl.
*A47J 31/46* (2006.01)
*A47J 31/36* (2006.01)
(Continued)

(52) U.S. Cl.
CPC ......... *A47J 31/461* (2018.08); *A47J 31/3614* (2013.01); *A47J 31/42* (2013.01);
(Continued)

(58) Field of Classification Search
CPC ...... A47J 31/461; A47J 31/469; A47J 31/468; A47J 31/3614; A47J 31/42; A47J 31/4489
See application file for complete search history.

(56) References Cited

U.S. PATENT DOCUMENTS

2003/0150333 A1* 8/2003 Fischer ................... A47J 31/54
99/279
2005/0193891 A1* 9/2005 Garson ............... A47J 31/3614
99/279
(Continued)

FOREIGN PATENT DOCUMENTS

CH 476484 A 8/1969
CN 2057490 U 5/1990
(Continued)

OTHER PUBLICATIONS

Extended European Search Report issued in connection with corresponding EP Application No. 17209242.1 dated Jun. 7, 2018.
(Continued)

*Primary Examiner* — Nathaniel E Wiehe
*Assistant Examiner* — Dilnessa B Belay
(74) *Attorney, Agent, or Firm* — Maschoff Brennan (57) ABSTRACT

A coffee machine makes use of a valve arrangement for controlling the coupling of a water heater outlet selectively to one of two or more outlets, such as a steam delivery nozzle, a brew chamber and a water collection unit (e.g. drip tray). The valve arrangement comprises a rotatable routing element, wherein the angular position of the routing element controls the coupling of the inlet channel to one of the outlets. The rotation is driven by rotational coupling to a brew chamber motor. This coffee machine design makes use of a single valve arrangement to provide the flow control from the water heater. This provides a compact arrangement with a low component count and simple control mechanism.

17 Claims, 9 Drawing Sheets

(51) Int. Cl.
*A47J 31/42* (2006.01)
*A47J 31/44* (2006.01)
(52) U.S. Cl.
CPC ......... *A47J 31/4489* (2013.01); *A47J 31/468* (2018.08); *A47J 31/469* (2018.08)

(56) References Cited

U.S. PATENT DOCUMENTS

| | | | | |
|---|---|---|---|---|
| 2013/0167728 A1* | 7/2013 | Mori | ..................... | A47J 31/446 |
| | | | | 99/280 |
| 2015/0082990 A1* | 3/2015 | Wang | ..................... | F24H 1/102 |
| | | | | 99/302 R |
| 2015/0208851 A1 | 7/2015 | Grassia | | |

FOREIGN PATENT DOCUMENTS

| | | |
|---|---|---|
| CN | 1666054 A | 9/2005 |
| CN | 101557743 A | 10/2009 |
| CN | 101706011 A | 5/2010 |
| CN | 103126533 A | 6/2013 |
| CN | 105592757 A | 5/2016 |
| DE | 19545112 A1 * | 6/1997 ............. A47J 31/46 |
| DE | 19545112 A1 | 6/1997 |
| DE | 202011107306 U1 | 1/2012 |
| DE | 202012009074 U1 | 11/2012 |
| EP | 0 483 700 A1 | 5/1992 |
| WO | 2017063784 A1 | 4/2017 |

OTHER PUBLICATIONS

International Search Report and Written Opinion issued in connection with corresponding PCT Application No. PCT/EP2018/084651 dated Mar. 21, 2019.

* cited by examiner

FIG. 18

COFFEE MACHINE WITH INTEGRATED STEAM AND HOT WATER GENERATION

CROSS-REFERENCE TO RELATED APPLICATIONS

The present application is a U.S. National Phase application under 35 U.S.C. § 371 of International Application No. PCT/EP2018/084651, filed on Dec. 13, 2018, which claims the benefit of European Patent Application No. 17209242.1, filed on Dec. 21, 2017. These applications are hereby incorporated by reference herein.

FIELD OF THE INVENTION

This invention relates to coffee machines, and in particular coffee machines which generate hot water for coffee brewing and steam for use in frothing milk.

BACKGROUND OF THE INVENTION

Typically, full automatic espresso appliances provide the function of automated cappuccino brewing. In most cases, steam is used for heating and frothing the milk, in a similar manner to a barista.

In a first type of device, a milk frothing unit is connected outside the appliance to an interface that supplies steam out of the appliance to the milk frothing unit. The milk frothing unit is then positioned outside the main appliance and is thus removable from the base appliance, to improve the ease of cleaning. In particular, all parts in contact with milk need to be cleaned.

The input to the milk frothing unit receives steam, and delivers this to milk stored in the milk frothing unit. This avoids the steam interface becoming contaminated with milk, so that only the milk frothing unit needs to be cleaned after each use rather than any part of the appliance itself. The steam outlet is then typically integrated in a socket-like interface in the housing of the device and the milk frothing unit is plugged into this interface.

In a second type of device, milk frothing is achieved with a so-called cappuccinatore, which is a frothing tube that is inserted by a consumer into a container of milk.

In all these coffee machines, there is a single water heater, which is able to heat to a sufficient temperature to generate steam for the milk heating and frothing function and water for the coffee brewing function. Various valves and flow paths are needed to combine the different functions, such as a valve to control the flow to the brew chamber, a valve to control a discharge flow and a valve to control steam flow. These flow path couplings and control valves introduce significant cost. Traditionally, the water and steam supply systems are formed using standard off-the-shelf components such as electronic valves, passive over-pressure valves, junctions, hoses and hose connections. The level of integration of functionality is therefore limited and the hydraulic circuits are quite extensive.

This approach results in a relatively high hydraulic circuit complexity.

EP 2 062 512 discloses a coffee machine in which the three main valve functions are implemented by a valve block which essentially comprises the parallel combination of three independent valves. This reduces the amount of pipework needed and provides a more compact system, but it still has duplication of parts and many different components to make up the valve system.

DE 195 45 112 discloses an espresso machine as well as a multi-beverage machine for tea, coffee, steam and espresso. The multi-beverage machine makes use of a valve for coupling heated water to different parts of the machine, depending on the drink being produced.

There is a need for a coffee machine design which provides a low cost and compact valve arrangement for controlling the various hot water and steam flow paths within the machine.

SUMMARY OF THE INVENTION

The invention is defined by the claims.

According to examples in accordance with an aspect of the invention, there is provided a coffee machine comprising:

a water supply,
a water heater for heating water to generate steam and hot water, and having a water heater outlet;
a water pump for pumping the heated water and steam;
a steam delivery nozzle;
a brew chamber for brewing coffee with hot water;
a motor for driving the brew chamber between different positions including at least a ground coffee receiving position and a coffee brew position;
a water collection unit for collection or discharge of waste water; and
a valve arrangement for controlling the coupling of the water heater outlet selectively to the steam delivery nozzle, the brew chamber and the water collection unit, wherein the valve arrangement comprises:
an inlet channel coupled to the water heater outlet;
at least two outlets;
a rotatable routing element, wherein the angular position of the routing element controls the coupling of the inlet channel to one of the outlets; and
a rotational coupling between the motor and the rotatable routing element.

This coffee machine design makes use of a single valve arrangement to provide the flow control from the water heater. A single inlet channel (for steam and hot water) connects to the possible outlets using a rotatable routing element. This provides a compact arrangement with a low component count. The setting of the valve is achieved simply by rotating the routing element, and the water or steam at the inlet channel is then routed to the desired outlet. Rotation of the routing element can be done through the same motor that drives the brew chamber between its different positions. So no need for additional driving means. This again provides a compact arrangement, with a low component count, that can easily fit into the confined space of the coffee machine.

The two or more outlets for example can be selected from a steam outlet, a brew chamber outlet and a water collection outlet.

The motor for example has an output shaft which couples (directly or indirectly) to a main cog which controls the movement of the brew chamber, for example between a home position (in which coffee grinds are received, and therefore hereinafter also referred to as ground coffee receiving position), an intermediate position and a brew position. The valve setting may also be controlled by coupling to that main cog, although other couplings are possible.

An output shaft of the brew chamber motor or any gear forming part of the drivetrain of the motor may be used to control the valve setting.

When in the home or ground coffee receiving position, the valve is for example controlled to couple the inlet channel to the water collection outlet. When in the brew position, the valve is for example controlled to couple the inlet channel to the brew chamber outlet. When between the home position and the brew position, the valve is for example controlled to couple the inlet channel to the steam outlet for enabling milk heating and/or frothing.

The inlet channel may comprise a passageway aligned along the axis of rotation of the rotatable routing element. This provides a compact arrangement.

In another arrangement, the inlet channel comprises a passageway aligned perpendicular to the axis of rotation of the rotatable routing element with the inlet and outlet fluidly coupled in the same plane.

The valve arrangement may comprise a non-return valve along the inlet channel or one of the outlet channels. This may be used to prevent back flow into the valve inlet channel, which could cause contamination between the different flow paths. It may also provide a counter pressure to the heater to prevent water exiting the heater prematurely due to expansion of the water during heating. Thus, flow is prevented until the pump is activated, which overcomes the counter pressure.

The non-return valve for example comprises a diaphragm valve in which a diaphragm is spring biased against an exit opening of the inlet channel.

The flexing of a diaphragm valve in use has a beneficial influence on the prevention of calcification thereof as well as being practically insusceptible to sticking phenomena between valve elements.

A ball spring valve may alternatively be used.

In a first set of examples, the rotatable routing element comprises a rotatable cam, wherein each of the steam outlet, the brew chamber outlet and the water collection outlet has a respective in-line valve, wherein the cam is adapted to open a selected one of the in-line valves according to its rotational position.

This provides a design which may have a low profile, with the inlet channel and outlets defining radial paths.

The in-line valve associated with the water collection outlet is for example adapted to open when a threshold pressure is reached (e.g. between 15 and 20 bar). This provides a safety path to the water collection unit. The other in-line valves for example have a higher threshold pressure.

The valve arrangement may comprise a non-return valve (as mentioned above) at an end of the inlet channel at which the flow is diverted toward the steam outlet, the brew chamber outlet and the water collection outlet.

In a second set of examples, the rotatable routing element comprises a disk in which a connecting channel is formed, wherein each of the steam outlet, the brew chamber outlet and the water collection outlet is coupled to a feed channel, wherein the disk is adapted to connect a selected one of the feed channels to the inlet channel according to its rotational position.

This defines a disk based system. This has fewer moving parts in that a single disc functions as the flow blocking element for all valve outlets.

The valve arrangement may comprise a stationary disk adjacent the rotatable routing element disk, the stationary disk comprising a set of channels which align with the feed channels. Thus, there is a stacked two-disk design.

This provides a design which may have a low base area, for example with outlets defining axial paths parallel to the axis of rotation.

The valve arrangement may comprise a non-return valve (as mentioned above) along the inlet channel for controlling coupling between first and second portions of the inlet channel.

The rotatable routing element (and the second, stationary disk when present) for example comprises a ceramic disk.

In all examples, the water collection unit may comprise a drip tray. There may also be an additional over-pressure valve in line with the inlet channel.

The valve arrangement may be mounted onto or in close proximity to the water heater, with its inlet channel directly coupled to the water heater outlet, without intermediate hoses.

The coffee machine may comprise a bean-to-cup espresso machine, which then further comprises a bean grinder, and a ground bean compressor.

BRIEF DESCRIPTION OF THE DRAWINGS

Examples of the invention will now be described in detail with reference to the accompanying drawings, in which.

DETAILED DESCRIPTION OF THE EMBODIMENTS

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figs are merely schematic and are not drawn to scale. It should also be understood that the same reference numerals are used throughout the Figs to indicate the same or similar parts.

The invention provides a coffee machine that makes use of a valve arrangement for controlling the coupling of a water heater outlet selectively to one of two or more outlets, such as a steam delivery nozzle, a brew chamber and a water collection unit (e.g. drip tray). The valve arrangement comprises a rotatable routing element, wherein the angular position of the routing element controls the coupling of the inlet channel to one of the outlets. The rotation is driven by a rotational coupling to a brew chamber motor.

This coffee machine design makes use of a single valve arrangement to provide the flow control from the water heater. This provides a compact arrangement with a low component count and simple control mechanism.

Figure 1:
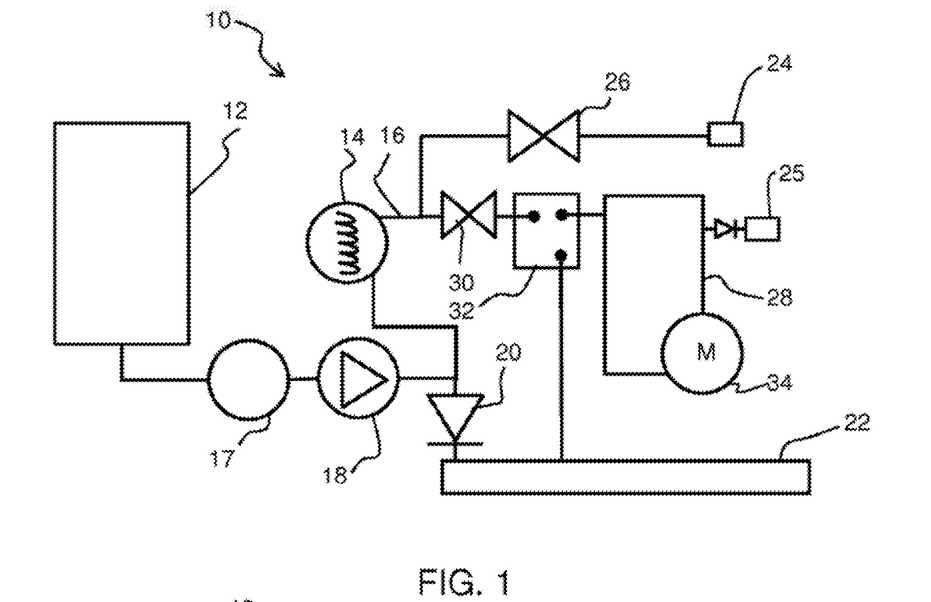
FIG. 1 shows the components of a known full function espresso coffee machine, and in particular shows the fluid paths in the system.

FIG. 1 shows the components of a known full function espresso coffee machine, and in particular shows the fluid paths in the system.

The coffee machine 10 comprises a water container 12, a water heater 14 for heating water to generate steam and hot water and having a water heater outlet, and a water pump 18 for pumping the heated water and steam. There is additionally a water dosing flow meter 17.

The pump delivers water to the heater 14. In addition, there is an over-pressure valve 20 from the heater to a water collection unit 22 for collection or discharge of waste water in the form of a drip tray.

The heated steam is provided to a steam delivery nozzle 24 through a first electronic valve 26. There is a coffee delivery nozzle 25 with an in-line crema valve. The heated water is provided to a brew chamber 28 through a second valve 30 and also through a control unit 32. The control unit 32 allows water to be discharged to the water collection unit 22 for example during cooling down of the heater. Its function is described further below.

The brew chamber 28 is driven by a motor 34 for driving the brew chamber between different positions. These positions including at least a ground coffee receiving position and a coffee brew position.

The coffee machine makes use of single heater 14 to selectively supply hot water of about 100° C. for brewing coffee, and steam of about 140° C. (or more) for heating and/or frothing milk.

The machine may have a pressurizing system for the brew chamber. It may further have a reservoir for receiving coffee beans and a grinder, so that a full bean-to-cup function is provided. Alternatively, the ground coffee may be supplied in a capsule, pod or the like pre-portioned provision. These elements are not shown as they do not relate to the hydraulic components.

An espresso coffee is typically made by forcing pressurized water to flow through a quantity of coffee grind. The brewing chamber is for example removably arranged in order to facilitate emptying and cleaning of the brewing chamber.

During an espresso making process, the coffee grind may be compressed to a certain extent. To this end, the machine may for example comprise a piston, which is movably arranged in a cylindrical brewing chamber, and which is capable of sealing an open top side of the brewing chamber.

Movement of the piston controls the extent of compression of the coffee grind. When the coffee grind is compressed more and more, a flow through resistance of the coffee grind increases. During an espresso making process, a brewing pressure at which the process is performed, i.e. a pressure at which the water is conducted through the coffee grind, is determined by the flow through resistance of the coffee grind.

The brewing pressure is a determining factor for important characteristics of the espresso drink, including the taste, and the texture of a foam layer. The brewing pressure is thus for example controlled by varying a position of the piston and/or the water flow.

The operation of the machine in generating an espresso coffee drink is entirely conventional, and the general operation of the coffee machine will not be described in detail. Instead, only details relating to the control of flow through the machine will be explained. Furthermore, this full function espresso machine is only one example of the type of coffee machine to which the invention may be applied.

When the machine is to prepare coffee, the heater 14 is first heated up to about 140° C. (or more) to supply steam to heat and/or froth milk. The heater is then cooled down to about 100° C. to provide hot water for brewing coffee. During the cooling down phase from 140 to 100° C., water coming from the heater may still be too hot for brewing coffee. This water is discharged to the water collection unit 22 by the control unit 32.

The control unit 32 is a coupling between the valve 30 and the brewing chamber 28 but in dependence on the brew chamber position. Thus, this unit does not select between flow paths but instead it functions as a physical interrupt unit which allows or interrupts the connection between the valve 30 and the brew chamber 28.

When the brew chamber is in its home position (which is a rest position at which it is positioned for receiving coffee, e.g. from a grinder), the valve 30 is not connected to the brew chamber 28 so the brew chamber is not connected to the water supply system.

When the brew chamber is moved from the home position to the brew position, there is a control pin of the boiler which interfaces with the control unit 32, and this moves the valve 30 and configures the valve 30 to allow the fluid coupling.

The various valves used in the system are expensive and complex.

The invention instead provides a multivalve design to replace the three valves 20, 26, 30 discussed above.

Figure 2:
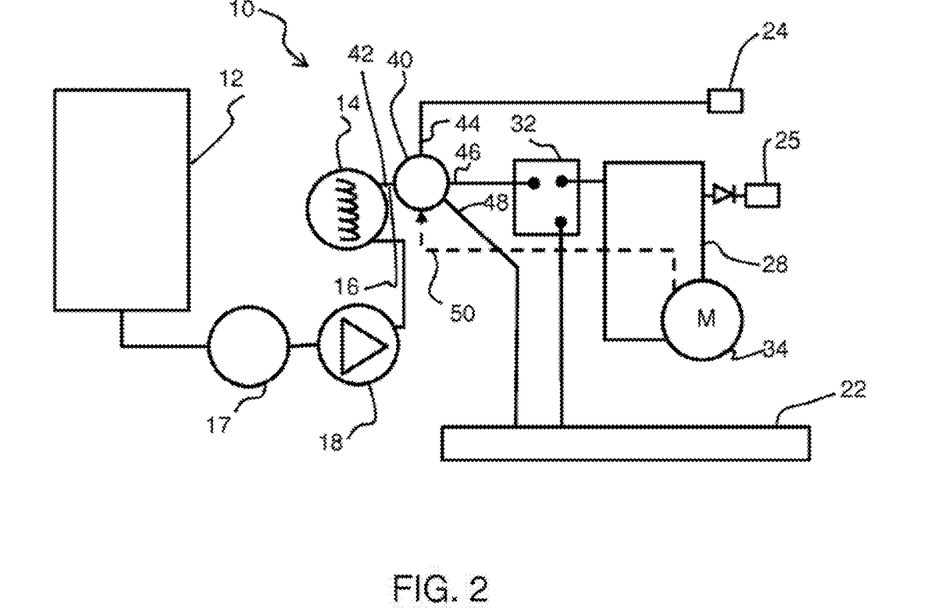
FIG. 2 shows the arrangement in accordance with an example of the invention.

FIG. 2 shows the arrangement in accordance with an example of the invention. The same reference numbers are used as in FIG. 1 for the same components. It can be seen that the three valves mentioned above have been replaced by a valve arrangement 40 for controlling the coupling of the water heater outlet selectively to the steam delivery nozzle 24, the brew chamber 28 and the water collection unit 22.

The valve arrangement comprises an inlet channel 42 coupled to the water heater outlet, a steam outlet 44, a brew chamber outlet 46 and a water collection outlet 48.

Within the valve arrangement there is a rotatable routing element, wherein the angular position of the routing element controls the coupling of the inlet channel to one of the steam outlet, the brew chamber outlet and the water collection outlet. A rotational coupling 50 is provided between the motor and the rotatable routing element.

A particular advantage of this arrangement, in addition to being less expensive and complex, is that it may be operated by the same motor and/or gear system that is used to drive the brew chamber between its various positions, i.e. its home position when the brew chamber is located to receive coffee, and its closed brew position.

Three different brew chamber positions may be defined:
    A home position, in which the valve arrangement is set to discharge water to the water collection unit 22;

A brew position in which the valve arrangement is set to direct water to the brew chamber; and An intermediate position in which the valve arrangement is set to direct steam to the steam delivery nozzle 24.

FIGS. 3 to 6 show a first example of the valve arrangement.

Figure 3:
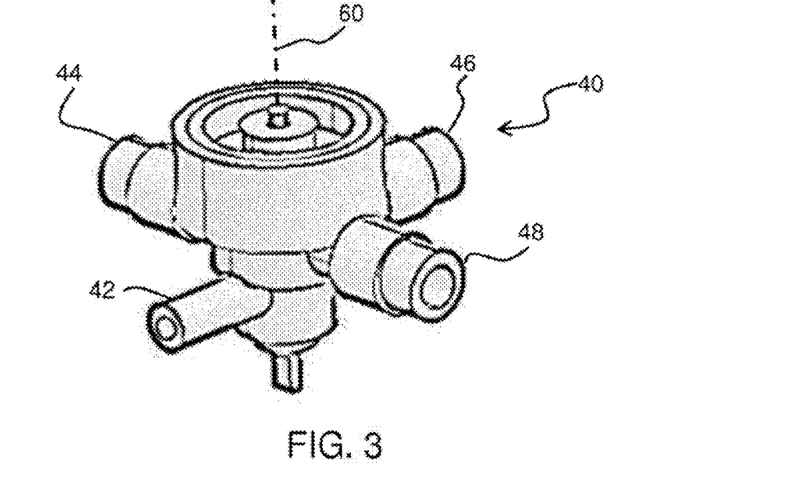
FIG. 3 shows a first example of a valve arrangement in perspective view.

FIG. 3 shows a perspective view. In this design, the inlet channel 42 is at one height and the steam outlet 44, brew chamber outlet 46 and water collection outlet 48 lie within a different plane. They lie in a plane perpendicular to the axis 60 of rotation.

Figure 4:
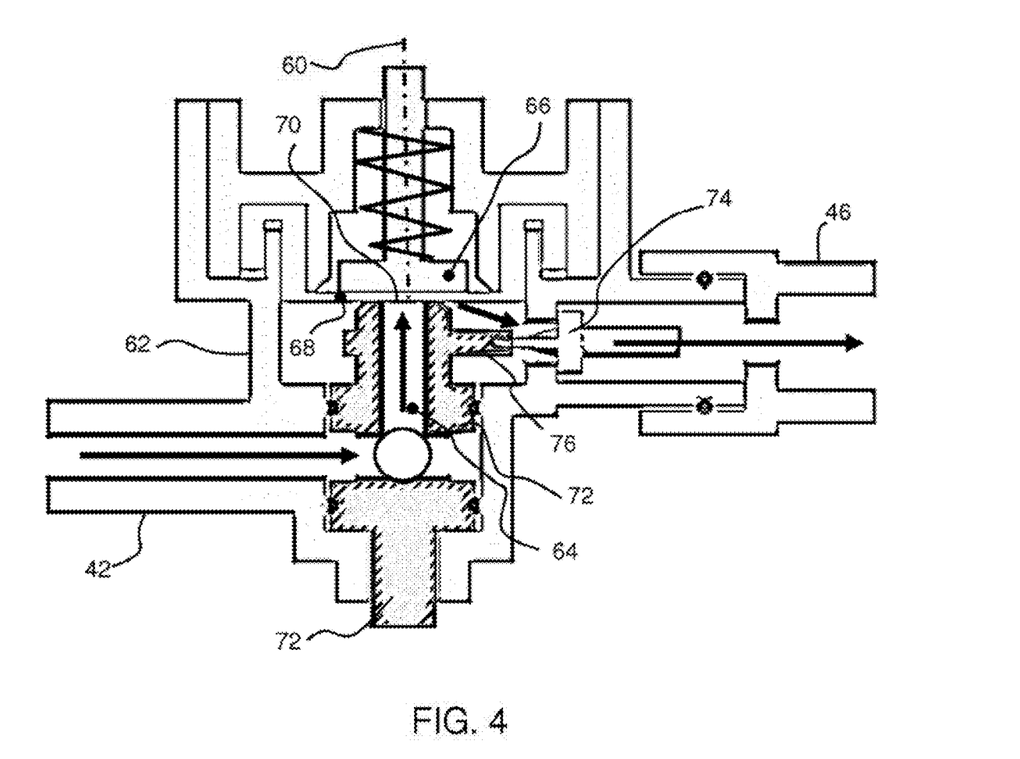
FIG. 4 shows the first example in cross sectional view.

FIG. 4 shows a cross sectional view. The inlet channel 42 extends to the center of the valve body 62 then forms a passageway 64 aligned along the axis of rotation 60.

At the top of the passageway 64 is a non-return valve 66. This is used to prevent back flow into the valve inlet channel 42, which could cause contamination of the different flow paths. It may also provide a counter pressure (e.g. 0.4 bar) to the heater to prevent water exiting the heater prematurely due to expansion of the water during heating. Thus, flow is prevented until the pump is activated, which overcomes the counter pressure.

In the illustrated embodiment, the non-return valve 66 comprises a diaphragm valve in which a diaphragm 68 is spring biased against an exit opening 70 of the inlet channel, more particularly the passageway 64.

The flexing of a diaphragm valve has a beneficial influence on the prevention of calcification thereof as well as being practically insusceptible to sticking phenomena between valve elements.

The rotatable routing element comprises a rotatable cam 72. Each of the steam outlet, the brew chamber outlet and the water collection outlet has a respective in-line valve. FIG. 4 shows the in-line valve 74 for the brew chamber outlet 46. The cam 72 opens a selected one of the in-line valves according to its rotational position. The cam is driven by connection of a rotary input (from the brew chamber motor drivetrain) to its base.

FIG. 4 shows the cam surface 76 in contact with the in-line valve 74 and thus shows the position in which that valve is opened.

This design has a low profile, with the inlet channel and the outlets defining radial paths.

The in-line valve at the water collection outlet (not shown in FIG. 4) preferably is designed to open when a threshold pressure is reached (e.g. between 15 and 20 bar such as for example 17 bar) so that it can function as a safety discharge outlet. This provides a safety path to the water collection unit 22. Thus, when the pressure exceeds the threshold pressure, the discharge outlet will open, allowing water/steam to be discharged.

Figure 5:
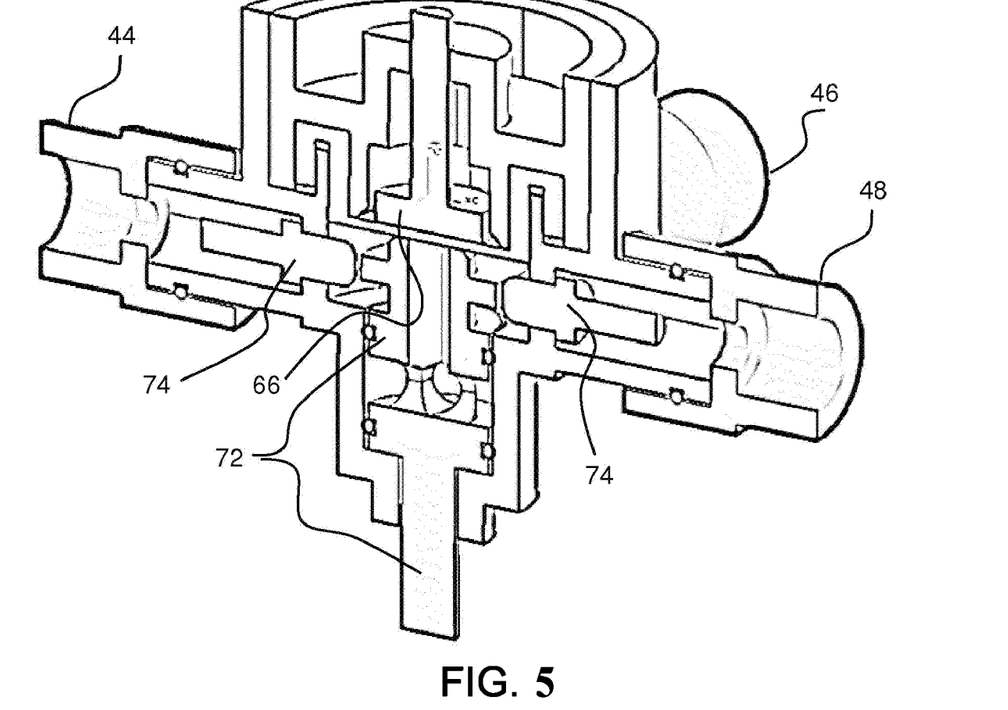
FIG. 5 shows the first example as a perspective view in cross section.

FIG. 5 shows a perspective view in cross section, with the cross section through the steam outlet 44 and the water collection outlet 48.

Figure 6:
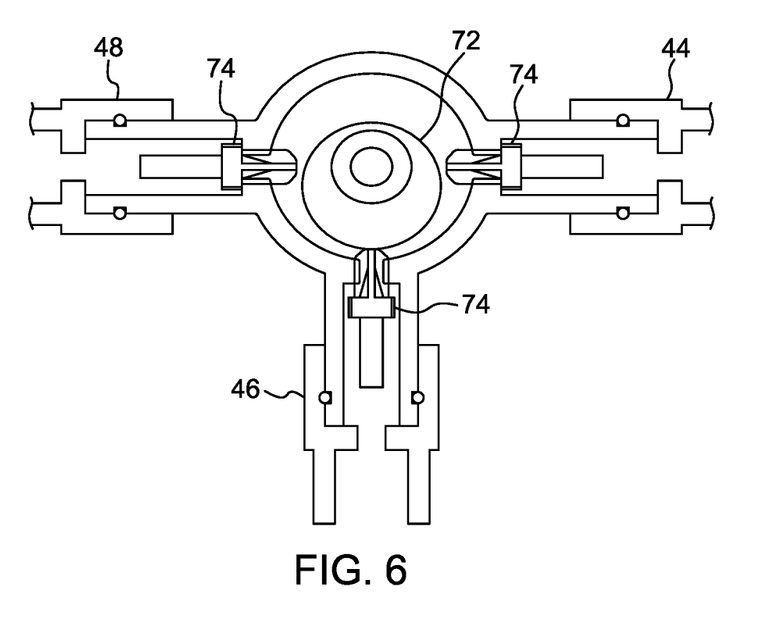
FIG. 6 shows the first example as a cross section in plan view.

FIG. 6 shows a cross section in plan view. It shows the shape of the cam 72, and shows how it urges a selected one of the in-line valves 74 open. These valves are spring biased into a closed position.

This design thus generally makes use of an eccentric cam on a shaft that is rotated by the brew chamber motor.

FIGS. 7 to 11 show a second example of the valve arrangement.

Figure 7:
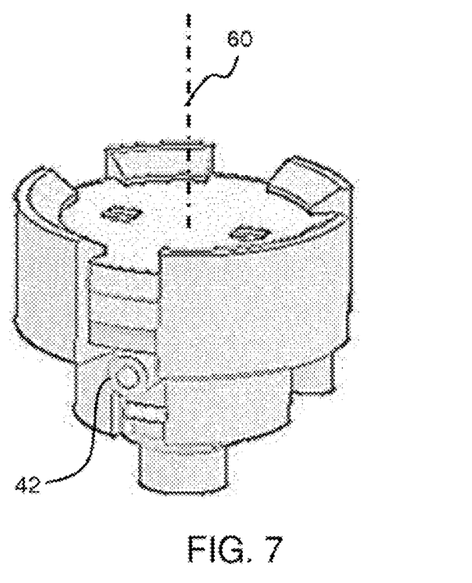
FIG. 7 shows a second example of the valve arrangement in a first perspective view.
Figure 8:
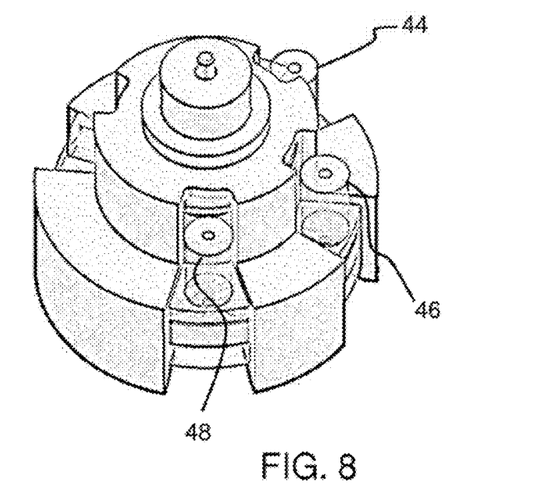
FIG. 8 shows a second example of the valve arrangement in a second perspective view.

FIGS. 7 and 8 show perspective views. In this design, the inlet channel 42 is a radial channel and the steam outlet 44, brew chamber outlet 46 and water collection outlet 48 lie along an axial direction, parallel to the axis of rotation 60.

Figure 9:
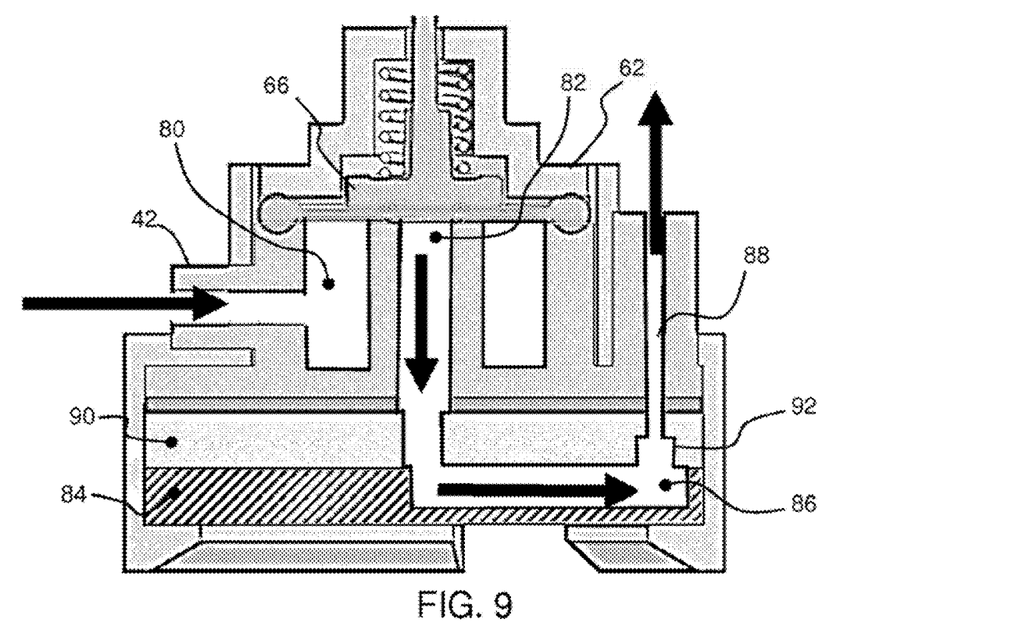
FIG. 9 shows the second example as a cross sectional view.

FIG. 9 shows a cross sectional view. The inlet channel 42 extends towards the center of the valve body 62 then forms a first passageway 80 aligned annularly around the axis of rotation 60 and then a second channel 82 along the axis. The diaphragm valve 66 controls the flow between the two passageways 80, 82 and performs the same function as in the example above. It allows or prevents a 180 degree coupling between the first and second passageways (which are parallel portions of the inlet channel).

In this second set of examples, the rotatable routing element comprises a rotatable disk 84 in which a connecting channel 86 is formed, wherein each of the steam outlet, the brew chamber outlet and the water collection outlet is coupled to a feed channel 88. The rotatable disk connects a selected one of the feed channels 88 to the inlet channel 42 according to its rotational position.

This defines a disk based system. This has fewer moving parts in that a single disk functions as the flow blocking element for all valve outlets. The rotatable disk may be a ceramic disk.

A stationary disk 90 is provided adjacent the rotatable disk 84, and the stationary disk has a set of channels 92 which align with the feed channels 88. Thus, there is a stacked two-disk design. The stationary disk may be a ceramic disk.

Figure 10:
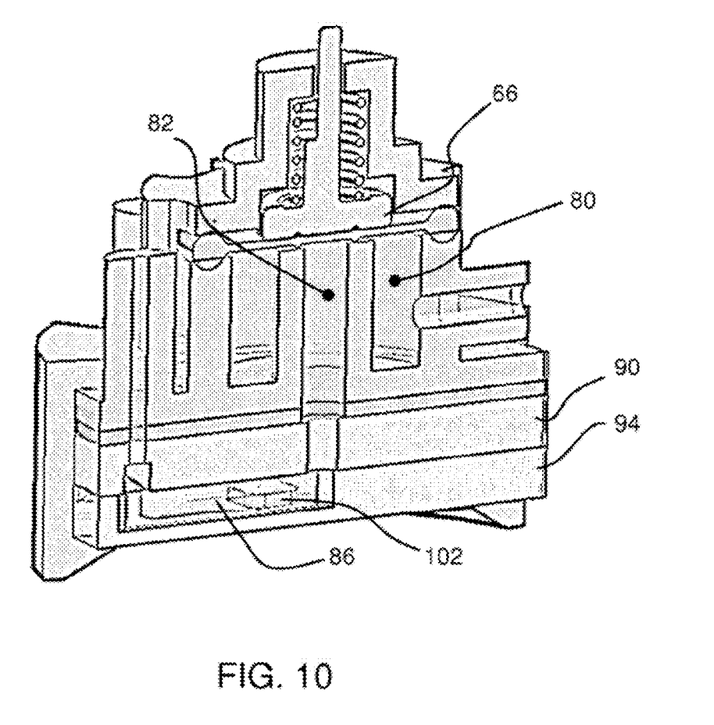
FIG. 10 shows the second example as a perspective view in cross section.

FIG. 10 shows a perspective view in cross section.

Figure 11:
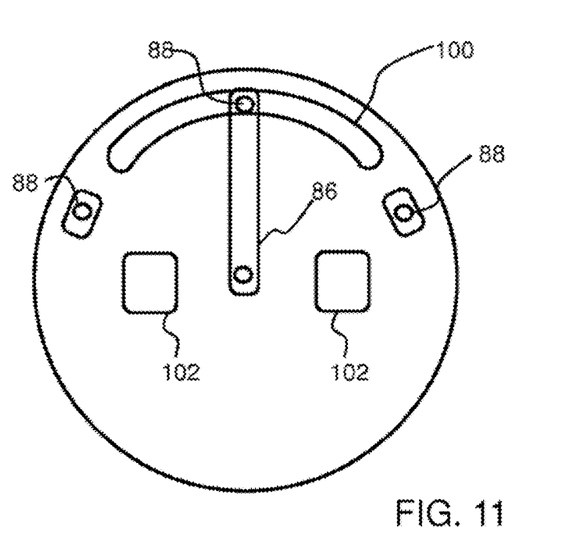
FIG. 11 shows a possible shape for the slots in the disks.

FIG. 11 shows a possible shape for the various slots, channels and passageways in the disks.

The connecting channel 86 may have a radial path, as illustrated. At the end of the radial path there is an arcuate path 100. During rotation, two outlets will initially be coupled to the channel 86 and hence the inlet channel 42 before the disk reaches its end position. Thanks to the arcuate path 100 the positioning of the disk can be less precise in the final position. During the adjustment, the second outlet that is additionally coupled before the disk reaches its final position is the water collection outlet for safety. However, during such adjustments, the pump is not activated in any case.

FIG. 11 shows recesses 102 used for driving the disk. One recess 102 can also be seen in FIG. 10. These recesses may be accessed via openings in the base of the valve housing, one of which can be seen in FIG. 9.

Figure 12:
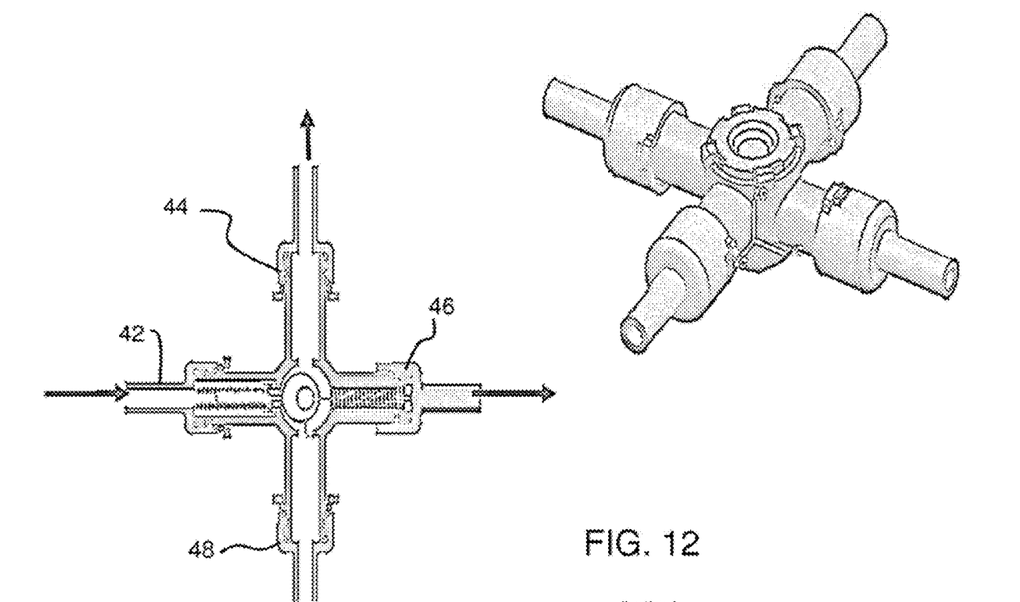
FIG. 12 shows a modification to the first example.

FIG. 12 shows a modification to the version of FIGS. 3 to 6 in which the inlet channel 42 and the three outlets 44, 46, 48 lie in the same plane to give a more compact design. Thus, the inlet channel is no longer aligned along the axis of rotation of the rotatable routing element but is instead aligned perpendicular to the axis of rotation of the rotatable routing element with the inlet and outlet fluidly coupled in the same plane.

Figure 13:
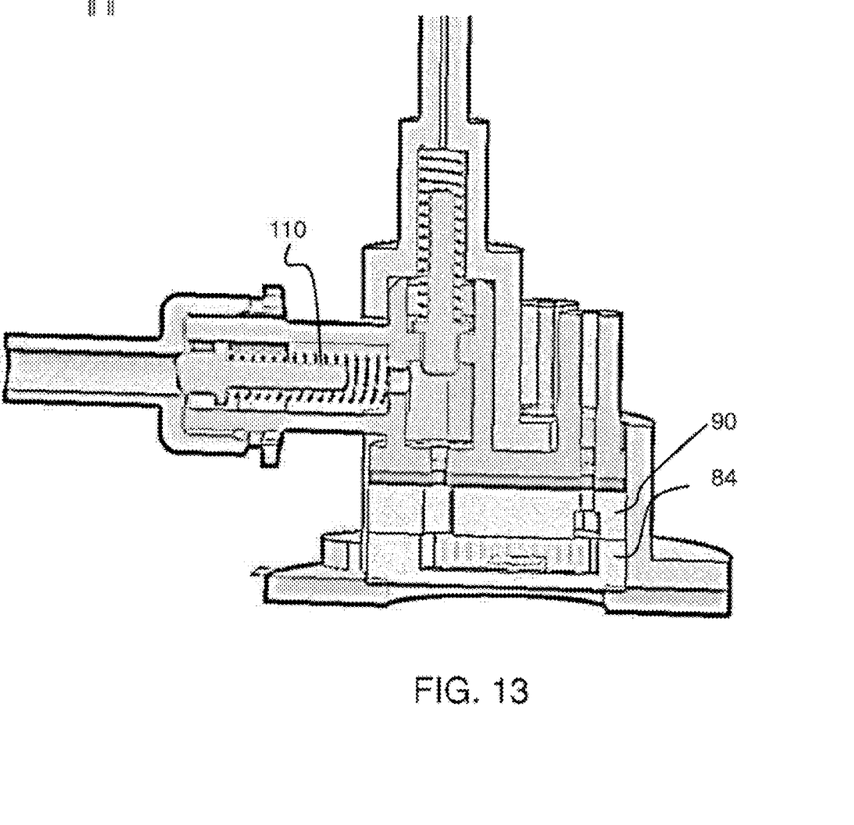
FIG. 13 shows that for a design of the type of the second example, an over-pressure valve may also be provided.

FIG. 13 shows that for a design of the type of FIGS. 7 to 11 (where there are not already internal regulating valves as part of the design), an over-pressure valve 110 may also be provided, in this example at the inlet channel.

Figure 14:
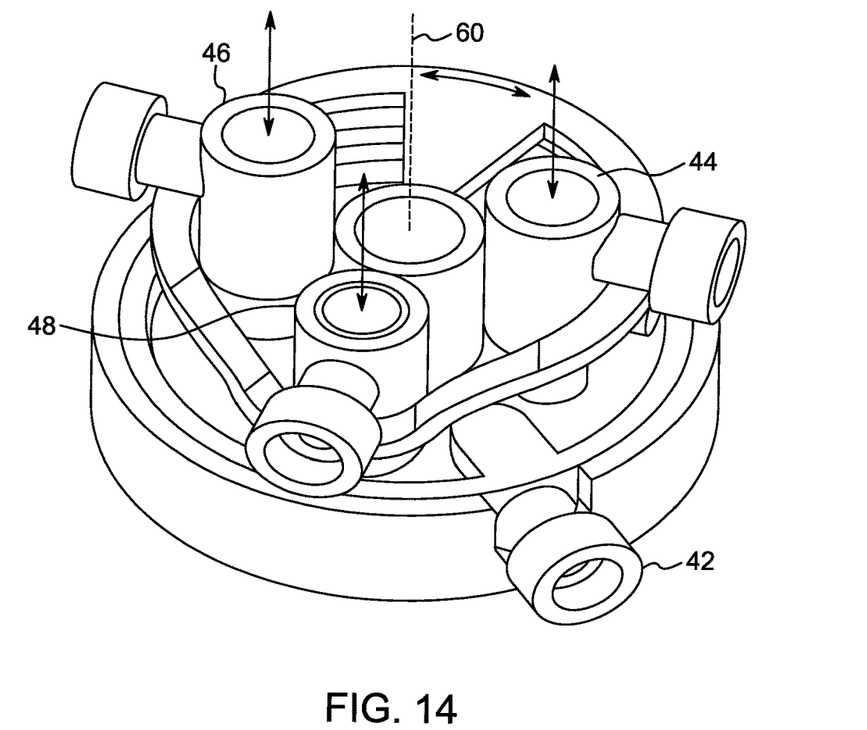
FIG. 14 shows schematically a further example of the valve arrangement.

FIG. 14 shows schematically a further example in which rotation of the routing part of the valve arrangement causes valves to rise and fall. For example, a valve may be opened by pushing up a valve seat for a valve at the respective outlet 44, 46, 48. An additional over-pressure valve may be provided, either associated with one of the existing outlets, or with a dedicated separate outlet. This example for example uses a 3D profiled disc to act on the valve seats.

Figure 15:
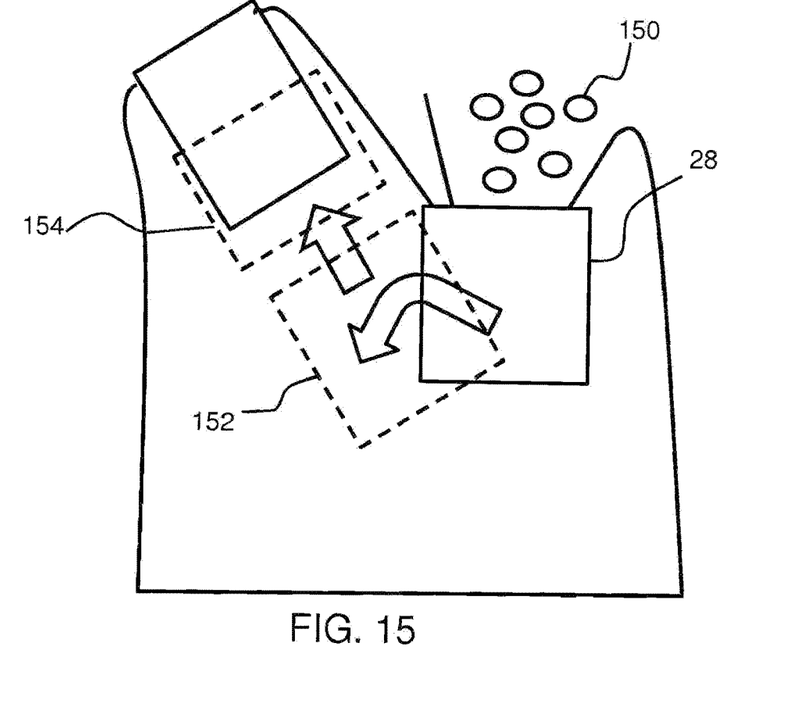
FIG. 15 shows schematically positions of the brew chamber.

FIG. 15 shows schematically the different brew chamber positions. The brew chamber 28 is shown in a home position in which it can receive ground coffee 150, e.g. in a pod or capsule or, as illustrated, from a grinder. Thus, this is the position in which supply of coffee grinds takes place. This position of the brew chamber 28 is detected by a switch 166.

The brew chamber is driven to an intermediate position 152 and finally to a brew position 154. In this brew position 154, compression of the coffee grinds may take place as part of the brewing process, and extracted coffee is delivered to the coffee delivery nozzle 25.

Figure 16:
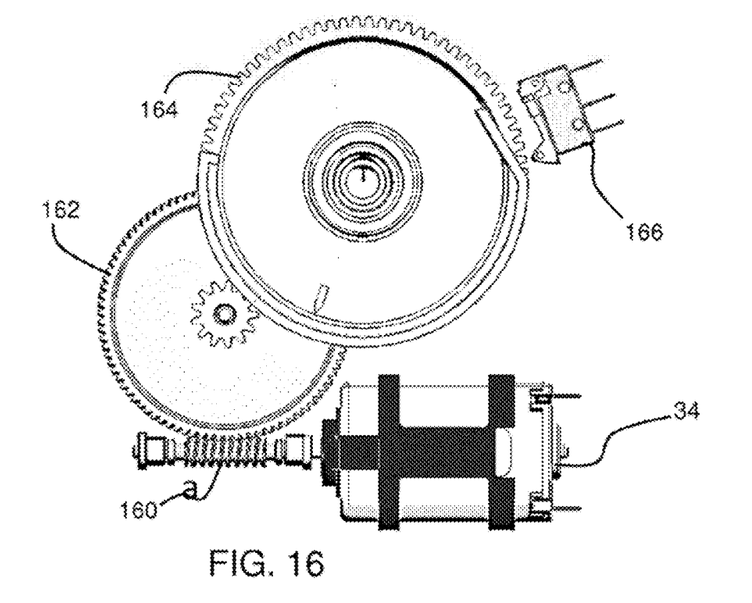
FIG. 16 shows one example of motor arrangement in side view.

FIG. 16 shows the motor 34 having an output shaft 160 in the form of a worm wheel. This engages with a first cog 162 which then drives a main cog 164 which controls the movement of the brew chamber 28 between the two end positions (the home position and the brew position). The main cog is associated with the detection switch 166 which detects particular angular orientations of the main cog. These corresponds to particular brew chamber positions.

Figure 17:
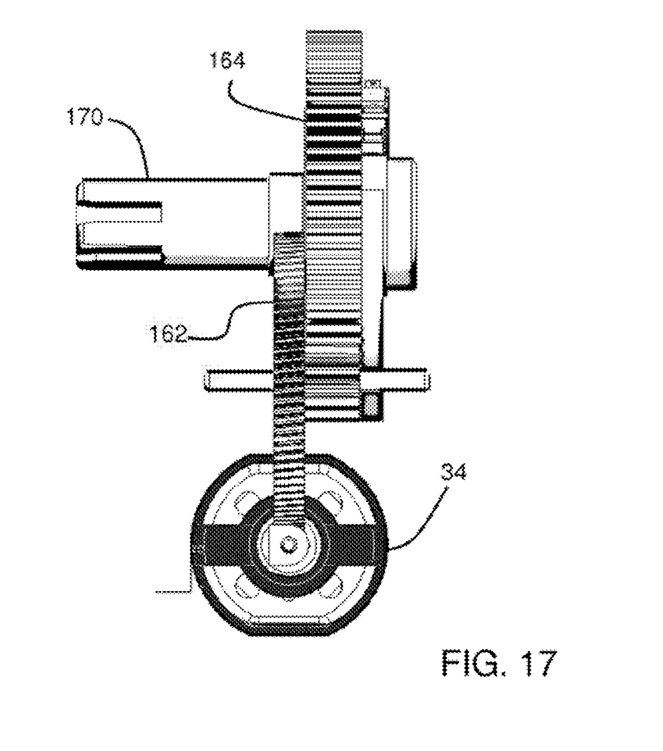
FIG. 17 shows the motor arrangement of FIG. 16 in end view.

FIG. 17 shows the arrangement of FIG. 16 in end view. The main cog 164 drives a main control shaft 170 which extends along the axis of rotation and controls the brew chamber movement.

The switch 166 is also used to detect when the brew chamber is in the brew position. Thus, there is feedback to ensure the brew chamber follows a known range of movement. There is also detection of the intermediate position, which as explained above is used to set the valve arrangement to direct steam to the steam delivery nozzle.

Detection of this intermediate position may for example be achieved by means of timing. Optionally, this timing may be calibrated every time the machine is switched on, by measuring the time it takes to travel between the two extreme positions and averaging this value over the last 3 measurements or so. Alternatively, a second position detection switch may be used. In another option, a middle position marker may be used that acts on the existing single switch.

Figure 18:
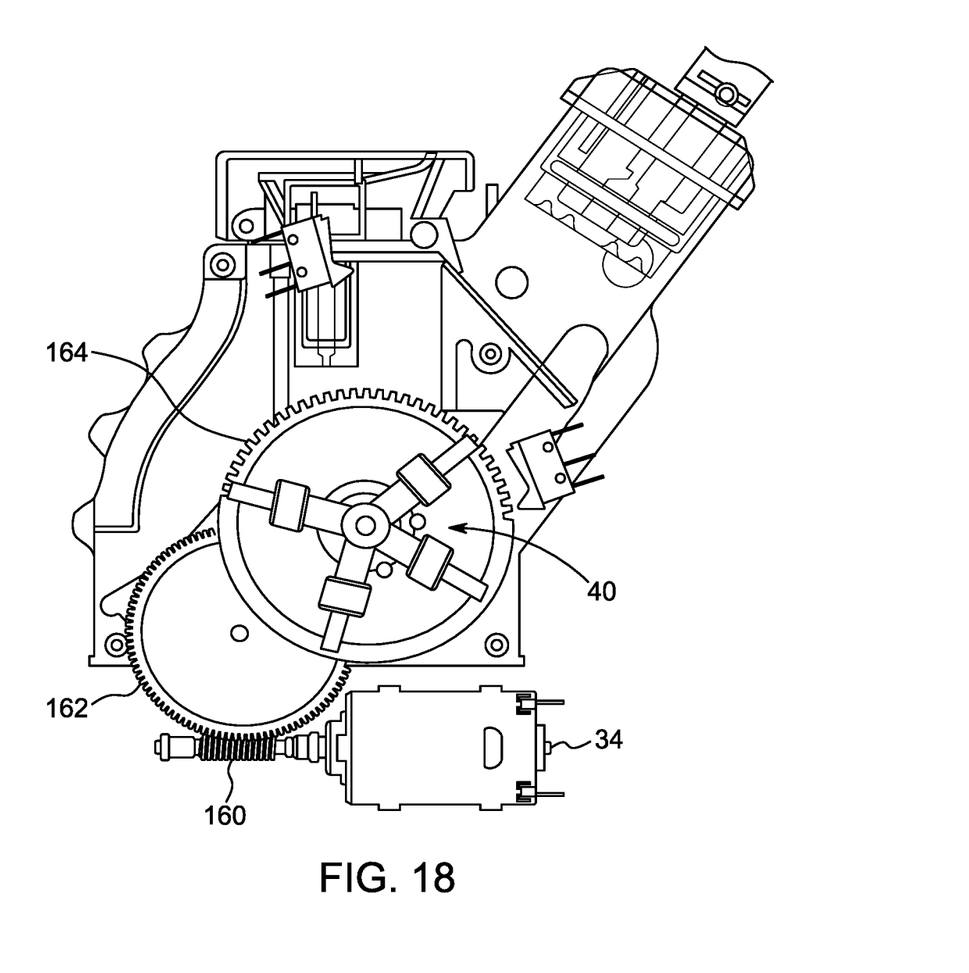
FIG. 18 shows the combination of the valve control with the brew chamber driving gearing.

The valve arrangement may be controlled based on rotation of the main cog 164. Indeed, the valve arrangement 40 may be mounted over the main cog 164 as shown schematically in FIG. 18. Thus, there is a coupling between the valve and the brew chamber drivetrain directly from the main (rotating) brew chamber control shaft 170 and its associated main cog. There may instead be gearing between the brew chamber control shaft 170 and the valve controller. The valve may instead be controlled by a separate rotational coupling to the motor worm gear 160.

It can be seen from the various examples above that various valve designs are possible. They each use a rotatable routing element to providing selective coupling between a shared inlet channel and a set of three (or more) outlets, with the rotation under the control of the brew chamber motor output shaft or gears forming part of the drivetrain of the brew chamber motor output shaft. This saves space and component count in the machine.

As explained above, the steam output is typically used for heating and/or frothing milk. A milk frothing unit may be part of the overall machine. Such unit may comprise a vessel for receiving milk, a steam input for receiving steam and a frothed milk output. The milk frothing unit may further comprise a steam channel which receives the steam flow, and a milk channel that may draw milk from the vessel by pressure differences based on a Venturi effect generated by the steam channel. Furthermore, a mixing chamber may be provided, for mixing the steam and milk and optionally air that may be drawn into the mixing chamber by a similar Venturi effect. The design and operation of a milk frothing unit is conventional. Further details of the milk frothing unit are thus not provided.

The coffee maker may comprise any suitable type of water heater for heating the water, for example a thermoblock or through flow heater.

The invention is of particular interest to a full function bean-to-cup espresso machine, as described above, but the invention can be applied generally to any drinks machine which has both hot water generation and steam output, using a shared heater, and for example with the steam being used for milk frothing.

For example, the invention may be applied to a capsule or pod-based system which receives pre-compressed coffee capsules or pods, or to a machine which receives pre-ground coffee.

The machine may have an internal or external water reservoir or may be plumbed in.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A coffee machine comprising:
    a water supply;
    a water heater for heating water to generate steam and hot water, and having a water heater outlet;
    a pump for pumping the hot water and the steam;
    a steam delivery nozzle;
    a brew chamber for brewing coffee with the hot water;
    a motor for driving the brew chamber between different positions including at least a ground coffee receiving position and a brew position;
    a water collection unit for collection or discharge of waste water; and
    a valve arrangement for controlling coupling of the water heater outlet selectively to the steam delivery nozzle, the brew chamber, and the water collection unit,
    wherein the valve arrangement comprises:
        an inlet channel coupled to the water heater outlet;
        two or more outlets;
        a rotatable routing element, wherein an angular position of the rotatable routing element controls coupling of the inlet channel to one of the two or more outlets; and
        a rotational coupling between the motor and the rotatable routing element, wherein rotation of the rotatable routing element is done through the same motor that drives the brew chamber between its different positions.

2. The coffee machine of claim 1, wherein the two or more outlets are selected from the following outlets: a steam outlet, a brew chamber outlet, and a water collection outlet.

3. The coffee machine of claim 1, wherein the inlet channel comprises:
    a passageway aligned along the axis of rotation of the rotatable routing element; or
    a passageway aligned perpendicular to the axis of rotation of the rotatable routing element with the inlet channel and the two or more outlets fluidly coupled in the same plane.

4. The coffee machine of claim 1, wherein the valve arrangement comprises a non-return valve along the inlet channel or one of the two or more outlets.

5. The coffee machine of claim 4, wherein the non-return valve comprises:
a diaphragm valve in which a diaphragm is spring biased against an exit opening of the inlet channel; or
a ball spring valve.

6. The coffee machine of claim 1, wherein the rotatable routing element comprises a rotatable cam, wherein each of the two or more outlets has a respective in-line valve, and wherein the rotatable cam is adapted to open a selected one of the in-line valves according to its rotational position.

7. The coffee machine of claim 6, wherein one in-line valve is associated with a water collection outlet and is adapted to open when a threshold pressure is reached.

8. The coffee machine of claim 6, wherein the valve arrangement comprises a non-return valve along the inlet channel at which the flow is diverted toward the two or more outlets.

9. The coffee machine of claim 1, wherein the rotatable routing element comprises a disk in which a connecting channel is formed, wherein each of the two or more outlets is coupled to a feed channel, and wherein the disk is adapted to connect a selected one of the feed channels to the inlet channel according to its rotational position.

10. The coffee machine of claim 9, wherein the valve arrangement comprises a stationary disk adjacent to the rotatable routing element disk, the stationary disk comprising a set of channels which align with the feed channels.

11. The coffee machine of claim 9, wherein the valve arrangement comprises a non-return valve along the inlet channel for controlling a coupling between first and second portions of the inlet channel.

12. The coffee machine of claim 9, wherein the rotatable routing element comprises a ceramic disk.

13. The coffee machine of claim 1, further comprising an over-pressure valve in line with the inlet channel or in line with a water collection outlet.

14. The coffee machine of claim 1, wherein the inlet channel is directly coupled to the water heater outlet.

15. The coffee machine of claim 1, comprising a bean-to-cup espresso machine comprising a bean grinder, and a ground bean compressor.

16. The coffee machine of claim 7, wherein the valve arrangement comprises a non-return valve along the inlet channel at which the flow is diverted toward the two or more outlets.

17. The coffee machine of claim 10, wherein the valve arrangement comprises a non-return valve along the inlet channel for controlling a coupling between first and second portions of the inlet channel.

* * * * *